United States Patent
Yu et al.

(10) Patent No.: US 12,271,579 B2
(45) Date of Patent: Apr. 8, 2025

(54) CONTENT INPUT METHOD AND APPARATUS FOR INSTANT MESSAGING SOFTWARE, AND DEVICE AND MEDIUM

(71) Applicant: Beijing Zitiao Network Technology Co., Ltd., Beijing (CN)

(72) Inventors: Jie Yu, Beijing (CN); Chao Zhang, Beijing (CN); Cheng Jiang, Beijing (CN); Luobin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/650,990

(22) Filed: Apr. 30, 2024

(65) Prior Publication Data
US 2024/0281122 A1    Aug. 22, 2024

Related U.S. Application Data

(63) Continuation of application No. PCT/CN2022/130637, filed on Nov. 8, 2022.

(30) Foreign Application Priority Data

Nov. 12, 2021  (CN) .......................... 202111341329.0

(51) Int. Cl.
*G06F 3/048* (2013.01)
*G06F 3/0481* (2022.01)
(Continued)

(52) U.S. Cl.
CPC .......... *G06F 3/0484* (2013.01); *G06F 3/0481* (2013.01); *G06F 40/166* (2020.01)

(58) Field of Classification Search
CPC ..... G06F 3/0484; G06F 3/0481; G06F 40/166
See application file for complete search history.

(56) References Cited

U.S. PATENT DOCUMENTS

| 2003/0208543 A1* | 11/2003 | Enete | ...................... | H04N 7/147 |
| | | | | 348/E7.071 |
| 2005/0080866 A1* | 4/2005 | Kent | .................... | G06Q 10/107 |
| | | | | 709/207 |

(Continued)

FOREIGN PATENT DOCUMENTS

| CN | 102279708 A | 12/2011 |
| CN | 106156014 A | 11/2016 |

(Continued)

OTHER PUBLICATIONS

Authors et al., Instant chat reply interruption during preparation of a response, 2012, IP.com, 14 pages. (Year: 2012).*

(Continued)

*Primary Examiner* — Linh K Pham

(57) ABSTRACT

The present disclosure relates to a content input method and apparatus for instant messaging software, and a device and a medium. The instant messaging software includes a first input box and a second input box, wherein the first input box and the second input box are switched by means of a switching control, and the sizes of the first t input box and the second input box are different. The method comprises: receiving target input content, which is input into a first input box, and displaying the target input content in the first input box; and in response to the triggering of a switching control, displaying the target input content in a second input box.

17 Claims, 11 Drawing Sheets

(51) Int. Cl.
*G06F 3/0484* (2022.01)
*G06F 40/166* (2020.01)

(56) References Cited

U.S. PATENT DOCUMENTS

| | | | | |
|---|---|---|---|---|
| 2014/0019885 | A1* | 1/2014 | Jung | H04M 1/7243 |
| | | | | 715/758 |
| 2015/0012881 | A1 | 1/2015 | Song et al. | |
| 2015/0263996 | A1* | 9/2015 | Abate | G06F 3/0481 |
| | | | | 715/753 |
| 2016/0154686 | A1* | 6/2016 | Huang | G06F 3/0488 |
| | | | | 715/780 |
| 2018/0181560 | A1* | 6/2018 | Qiao | G06F 16/248 |
| 2021/0158594 | A1* | 5/2021 | Huang | H04N 5/2628 |

FOREIGN PATENT DOCUMENTS

| | | | | | |
|---|---|---|---|---|---|
| CN | 107765980 | A | | 3/2018 | |
| CN | 109299441 | A | | 2/2019 | |
| CN | 109460180 | A | | 3/2019 | |
| CN | 110427134 | A | | 11/2019 | |
| CN | 111221661 | A | | 6/2020 | |
| CN | 111507073 | A | | 8/2020 | |
| CN | 112099678 | A | * 12/2020 | | G06F 3/0481 |
| CN | 113050808 | A | | 6/2021 | |
| CN | 114063855 | A | | 2/2022 | |
| CN | 112099678 | B | * 4/2024 | | G06F 3/0481 |
| EP | 3951576 | A1 | * 2/2022 | | G06F 16/162 |
| JP | 2016502702 | A | | 1/2016 | |
| JP | 7165251 | B2 | * 11/2022 | | G06F 3/048 |
| WO | 2014180169 | A1 | | 11/2014 | |
| WO | 2020/062014 | A1 | | 4/2020 | |
| WO | WO-2023226848 | A1 | * 11/2023 | | |

OTHER PUBLICATIONS

Ren et al., A Study of the Size of Pen-Input Character Boxes for PDAs, 2004, IEEE, 8 pages. (Year: 2004).*
International Search Report received for PCT Patent Application No. PCT/CN2022/130637, mailed on Jan. 19, 2023, 5 pages (2 pages of English Translation and 3 pages of Original Document).
Office Action received for Chinese Patent Application No. 202111341329.0, mailed on Mar. 29, 2023, 16 pages (7 pages of English Translation and 9 pages of Original Document).
Xuejian, "Flask Web Developers, Advanced and Practical", Machinery Industry Press, Mar. 27, 2023, pp. 1-8.
Communication pursuant to Rules 70(2) and 70a(2) EPC for European Application No. 22891975.9, mailed Jan. 10, 2025, 1 page.
Extended European Search Report for European Application No. 22891975.9, mailed Dec. 23, 2024, 5 pages.
Notice of Reasons for Refusal for Japanese Patent Application No. 2024-525027, mailed on Feb. 4, 2025, 7pages.

* cited by examiner

CONTENT INPUT METHOD AND APPARATUS FOR INSTANT MESSAGING SOFTWARE, AND DEVICE AND MEDIUM

CROSS-REFERENCE TO RELATED APPLICATIONS

The present disclosure is a U.S. National Stage Application under 35 U.S.C. § 371 of International Patent Application No. PCT/CN2022/130637, filed on Nov. 8, 2022, which is based on and claims priority of Chinese application for invention No. 202111341329.0, filed on Nov. 12, 2021, the disclosure of which is hereby incorporated into this disclosure by reference in its entirety.

TECHNICAL FIELD

This disclosure relates to the field of the Internet technology, in particular to a content input method, apparatus for an instant messaging software, device and medium.

BACKGROUND

With the rapid development of computer communication technology, the use of instant messaging (IM) software is becoming increasingly widespread. IM software has made our daily lives and work easier by allowing us to send text, pictures, files, or emojis.

In the related arts, users can enter content in an input box and then send the input content to a designated recipient after completing the input to complete messaging.

SUMMARY

In a first aspect, the present disclosure provides a content input method for an IM software that comprises a first input box and a second input box being of a size different from a size of the first input box, and a switch control for switching between the first and the second input boxes, the content input method comprising:

receiving a target input content entered in the first input box, and displaying the target input content in the first input box;

in response to a triggering of the switch control, displaying the target input content in the second input box.

In a second aspect, the present disclosure provides a content input apparatus for an IM software that comprises a first input box and a second input box being of a size different from a size of the first input box, and a switch control for switching between the first and the second input boxes, the content input apparatus comprising:

a first display module for receiving a target input content entered in the first input box, and displaying the target input content in the first input box;

a second display module for displaying, in response to a triggering of the switch control, the target input content in the second input box.

In a third aspect, the present disclosure provides an electronic device, comprising: a processor for executing a computer program stored in memory, wherein the processor, when executing the computer program, implements the content input method provided in the first aspect.

In a fourth aspect, the present disclosure provides a computer readable storage medium storing thereon a computer program, characterized in that the computer program, when executed by a processor, implements the content input method provided in the first aspect.

In a fifth aspect, the present disclosure provides a computer program product that, when running on a computer, causes the computer to implement the content input method provided in the first aspect.

In a sixth aspect, the present disclosure provides a computer program, comprising: instructions that, when executed by a processor, cause the processor to perform the content input method according to any embodiments of the present disclosure.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

The technical solution of the present disclosure is capable of being applied to terminal devices, such as computers, tablets, mobile phones, or other smart electronic devices. A terminal device has a display screen, which can be a touch screen or a non-touch screen. For a terminal device with a touch screen, users can interact with the terminal device using gestures, fingers, or touch tools (such as a stylus). For a terminal device with a non-touch screen, interaction with the terminal device can be achieved using external devices (such as a mouse or keyboard).

As mentioned above, the input box of IM software may display less content, making it inconvenient for users to edit the input content.

In response to the above technical issues, this disclosure provides a content input method, an apparatus for an IM software, a device and a medium that are capable of facilitating users to edit the input content.

Figure 1A:
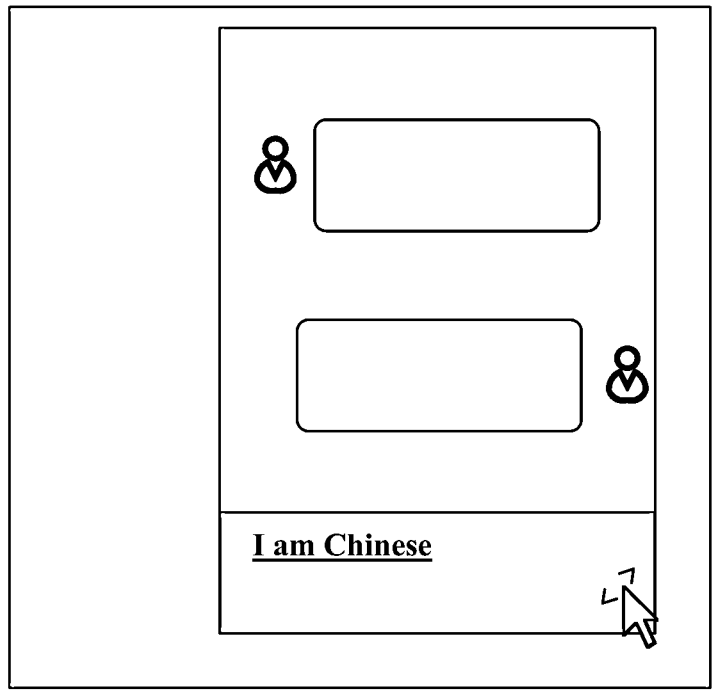
FIG. 1A is a schematic diagram of an input box provided in some embodiments of the present embodiment.
Figure 1B:
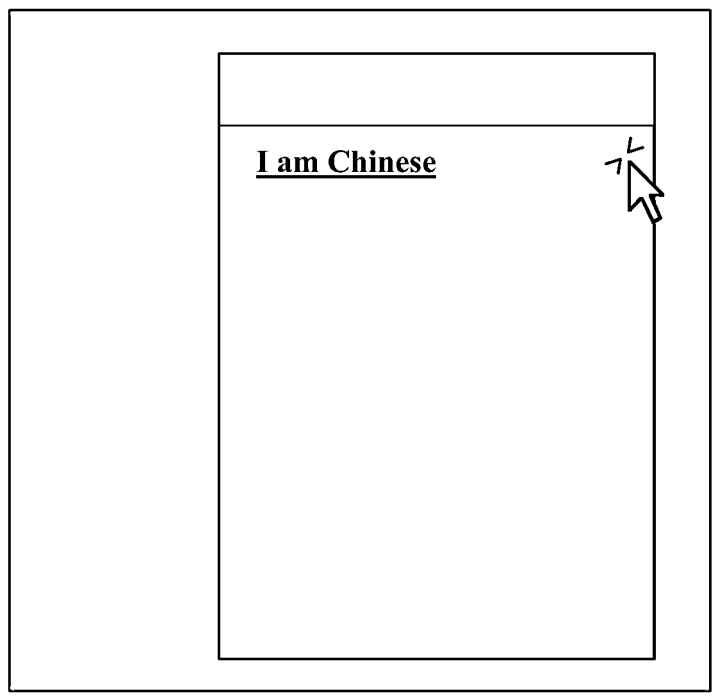
FIG. 1B is a schematic diagram of another input box provided in the present disclosure.

FIG. 1A is a schematic diagram of an input box provided in some embodiments of the present disclosure, and FIG. 1B is a schematic diagram of another input box provided in some embodiments of the present disclosure. A user can select a message recipient in an IM client and establish a session with the recipient. As shown in FIG. 1A, an input box is displayed on a session display interface of the IM software, and a user can enter content in the input box of the session interface. After completing the input of the content, the user can trigger a message sending operation to send the input content in the input box of the session interface to the recipient, thereby achieving messaging. As shown in FIG. 1A, the input box on the session display interface may have a relatively small size to avoid blocking the content of received messages. Therefore, in a case that a user enters a large amount of content, it is not convenient to view and edit the entered content in the input box of the session interface.

To solve this problem, a switch control may be provided in the input box of the session interface. By triggering the switch control, the input box can be switched to a rich text input box. The rich text input box is of a relatively large size and are capable of filling the session display interface, as shown in FIG. 1B. In this way, in a case that a user wants to enter a large amount of content, it is convenient to view and edit the entered content in the rich text input box. As shown in FIG. 1B, a switch control is also provided in the rich text input box, which are capable of being triggered to switch back to the input box of the session interface shown in FIG. 1A.

In summary, by triggering a switch control, the input box of the session interface can be switched to a rich text input box, and the rich text input box can also be switched to the input box of the session interface. The size of the rich text input box differs from the size of the input box of the session interface. For example, the size of the rich text input box is larger, while the size of the input box of the session interface is smaller, thus allowing to switch between large and small input boxes. In this way, the needs of users are met in different scenarios for input boxes of different sizes.

In the technical solution of the present disclosure, the first input box is an input box of a session interface, and the corresponding second input box is a rich text input box; or the first input box is a rich text input box, and the corresponding second input box is an input box of the session interface.

FIGS. 1, 4, 5, 7, 9 and 12 of this disclosure are illustrative examples of an input box on an interface only and do not limit the position and proportion of the input box on the interface.

In the technical solution of the present disclosure, the IM software comprises a first input box and a second input box having a size different from a size of the first input box. A switch control is used to switch between the first input box and the second input box, thereby achieving switching between a large input box and a small input box. By receiving a target input content entered in the first input box, the target input content is displayed in the first input box; in response to a triggering of the switch control, the first input box is switched to the second input box, and the target input content is displayed in the second input box, to achieve synchronized display of the input content in the large input box and the small input box, so that the input content in the small input box is displayed in the large input box, making it convenient for users to edit the input content.

The technical solution of the present disclosure is described below with reference to some embodiments.

Figure 2:
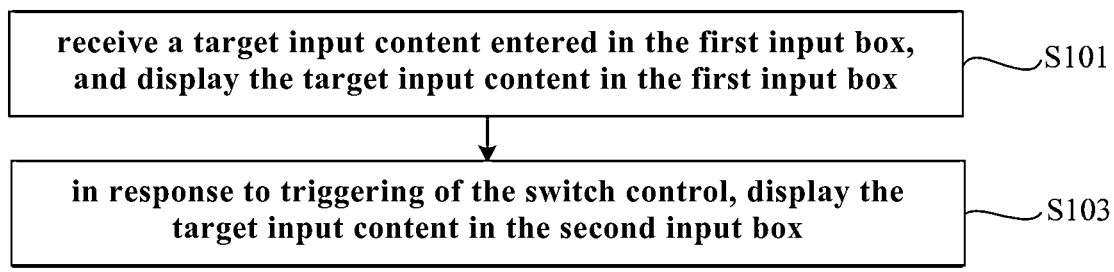
FIG. 2 is a flowchart of a content input method for IM software provided in some embodiments of the present disclosure.

FIG. 2 is a flowchart of a content input method for an IM software provided in some embodiments of the present disclosure. As shown in FIG. 2, the content input method comprises:

S101: receiving a target input content entered in the first input box, and displaying the target input content in the first input box.

The IM software comprises a first input box and a second input box having a size different from a size of the first input box, and a switch control for switching between the first and second input boxes.

For example, the first input box is an input box of the session interface shown in FIG. 1A, and the corresponding second input box is a rich text input box shown in FIG. 1B.

Alternatively, the first input box is a rich text input box shown in FIG. 1B, and the corresponding second input box is an input box of the session interface shown in FIG. 1A. If the first input box is an input box of the session interface shown in FIG. 1A, by triggering a switch control in the first input box, the first input box can be switched to the rich text input box, i.e., the second input box shown in FIG. 1B. Thus, a small input box can be switched to a large input box. If the first input box is a rich text input box as shown in FIG. 1B, by triggering the switch control in the first input box, the first input box can be switched to the input box, i.e., the second input box of the session interface as shown in FIG. 1A. Thus, a large input box can be switched to a small input box.

For example, the first input box is an input box of a session interface, as shown in FIG. 1A. In a case that a user enters a target input content "I am Chinese" in the first input box, "I am Chinese" is displayed in the first input box, as shown in FIG. 1A. For another example, the first input box is a rich text input box, as shown in FIG. 1B. In a case that a user enters a target input content "I am Chinese" in the first input box, "I am Chinese" is displayed in the first input box.

S103: in response to a triggering of the switch control, displaying the target input content in the second input box.

For example, the first input box is an input box of a session interface as shown in FIG. 1A. "I am Chinese" is displayed in the first input box, as shown in FIG. 1A. In a case that it is desired to switch to the second input box, the switch control in the first input box is triggered. In response to a triggering of the switch control, the first input box is switched to the second input box as shown in FIG. 1B. The target input content "I am Chinese" is also displayed in the second input box, so that the target input content in the small input box is synchronously displayed in the large input box.

For example, the first input box is a rich text input box as shown in FIG. 1B. "I am Chinese" is displayed in the first input box, as shown in FIG. 1B. In a case that it is desired to switch to the second input box, the switch control in the first input box is triggered. In response to a triggering of the switch control, the first input box is switched to the second input box as shown in FIG. 1A. The target input content "I am Chinese" is also displayed in the second input box, so that the target input content in the large input box is synchronously displayed in the small input box.

In the embodiments above, the IM software comprises a first input box and a second input box having a size different from a size of the first input box. A switch control is used to switch between the first input box and the second input box, thereby achieving switching between a large input box and a small input box. By receiving a target input content entered in the first input box, the target input content is displayed in the first input box; in response to a triggering of the switch control, the first input box is switched to the second input box, and the target input content is displayed in the second input box to achieve synchronized display of the input content in the large and small input boxes, so that the input content in the small input box can be displayed in the large input box, making it convenient for users to edit the input content.

Figure 3:
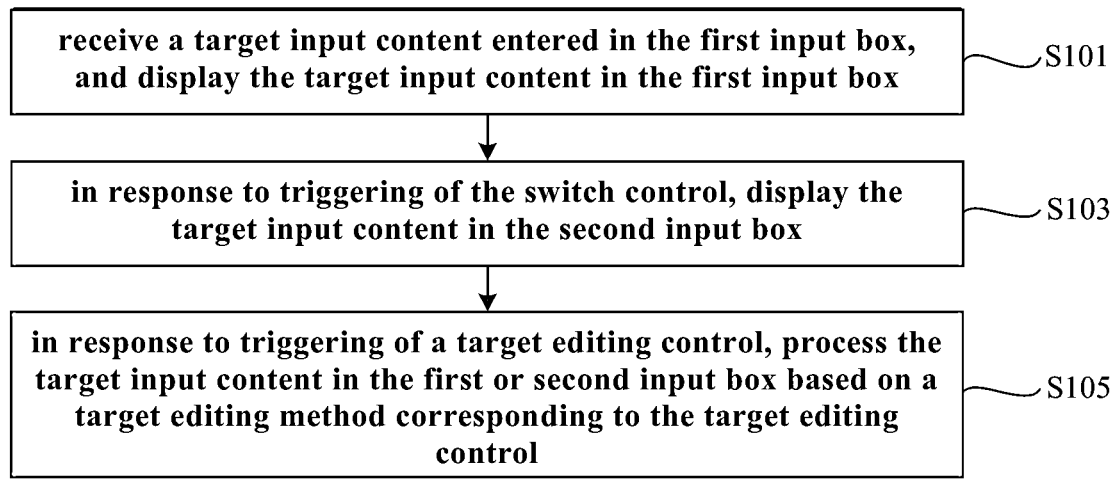
FIG. 3 is a flowchart of another content input method for an IM software provided in some embodiments of the present disclosure.

FIG. 3 is a flowchart of another content input method for an IM software provided in some embodiments of the present disclosure. As shown in FIG. 3, on the basis of the embodiments shown in FIG. 2, this content input method further comprises:

S105: in response to a triggering of a target editing control, processing the target input content in the first or second input box based on a target editing method corresponding to the target editing control.

The target editing control is one of a bold control, an underline control, a strikethrough control, an italic control, a hyperlink control, an arranged list control, an un-arranged list control or a reference control. Accordingly, the target editing method is to make it bold, to add an underline, to add a strikethrough, to add italics, to add a hyperlink, to list with arrangement, to list without arrangement, and to add a reference. In other embodiments, the target editing control is a font color control, a font type control, or other editing controls, which is not specifically limited in the embodiments.

Figure 4A:
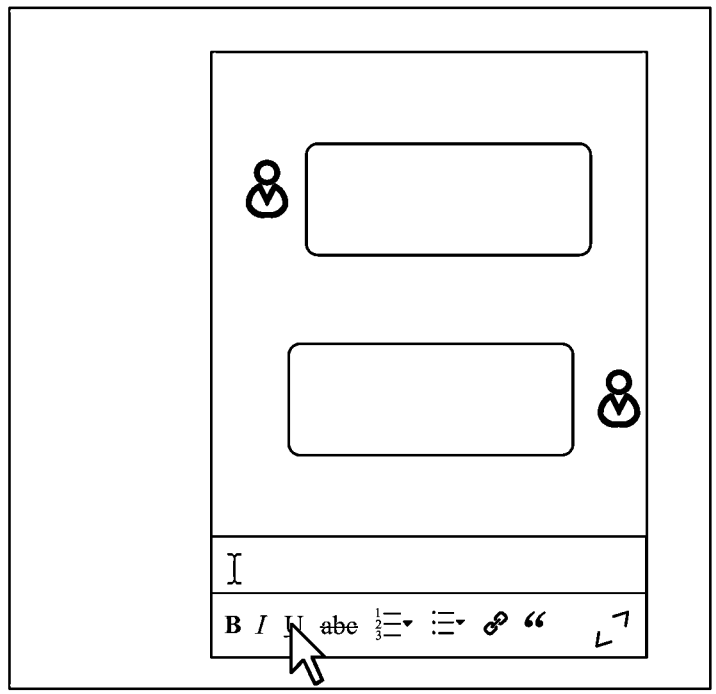
FIG. 4A is a schematic diagram of a display interface of an IM software provided in some embodiments of the present disclosure.

In practical applications, a user selects one of a plurality of content editing controls displayed by the IM client according to actual needs. The content editing control selected by the user is the target editing control. For example, in a case that the user needs to display the target input content in an underlined form, the underline control is selected and triggered as the target editing control, as shown in FIG. 4A.

Figure 4B:
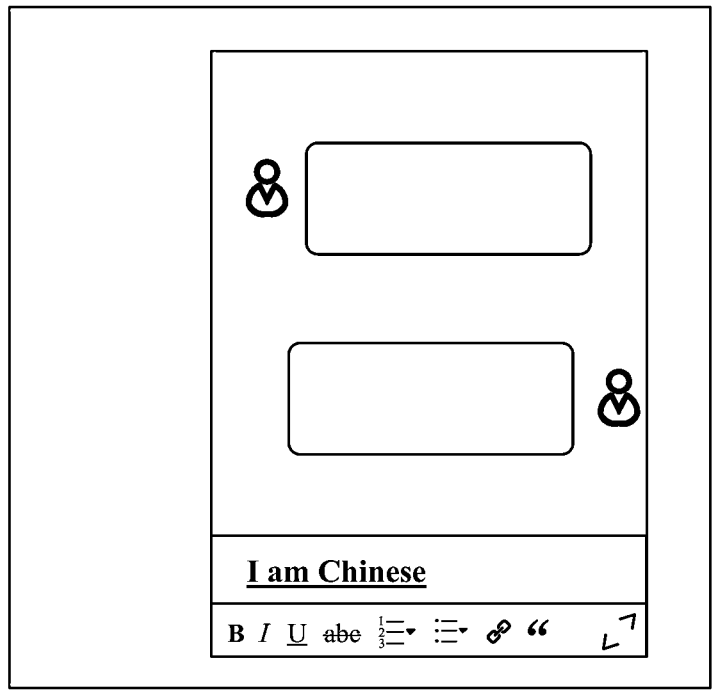
FIG. 4B is a schematic diagram of another display interface of an IM software provided in some embodiments of the present disclosure.

After receiving a trigger operation performed by the user on the target editing control, a response is made to the trigger operation. For example, in a case that the target editing control is an underline control, then in response to the underline control being triggered, an underline is added to the target input content in the target input box, such that the target input content is displayed in underlined form, as shown in FIG. 4B.

In other embodiments, in a case that the target editing control is a bold control, the target editing method is to make the target input content bold. Therefore, the target input content is made bold and displayed in bold style. Alternatively, in a case that the target editing control is a strikethrough control, the target editing method is to add a strikethrough. Therefore, a strikethrough is added to the target input content to display the target input content with a strikethrough. Alternatively, in a case that the target editing control is an italic control, the target editing method is to italicize. Therefore, the target input content is italicized and displayed in italic style. Alternatively, in a case that the target editing control is a hyperlink control, the target editing method is to set a link and associate it with the target input content, such that the target input content is displayed in a hyperlink style. Alternatively, in a case that the target editing control is an arranged list control, the target editing method is to arrange the target input content with numbers. Therefore, the target input content is numbered and displayed in an arranged list. Alternatively, in a case that the target editing control is an un-arranged list control, the target editing method is to arrange the target input content without numbering. Therefore, the target input content is arranged and displayed in an un-arranged list.

It should be noted that FIG. 4 only provides an explanation of the input box of the session interface as an example. In other embodiments, the target input content may also be processed in the rich text input box.

In some embodiments, the target input content is all the input content in the first input box. For example, the user may trigger the underline control before entering content in the first input box. After triggering the underline control, the user enters content in the first input box as shown in FIG. 4A, and all the input content is displayed in an underlined style, as shown in FIG. 4B. Obviously, all the input content in the first input box is the target input content.

Figure 5A:
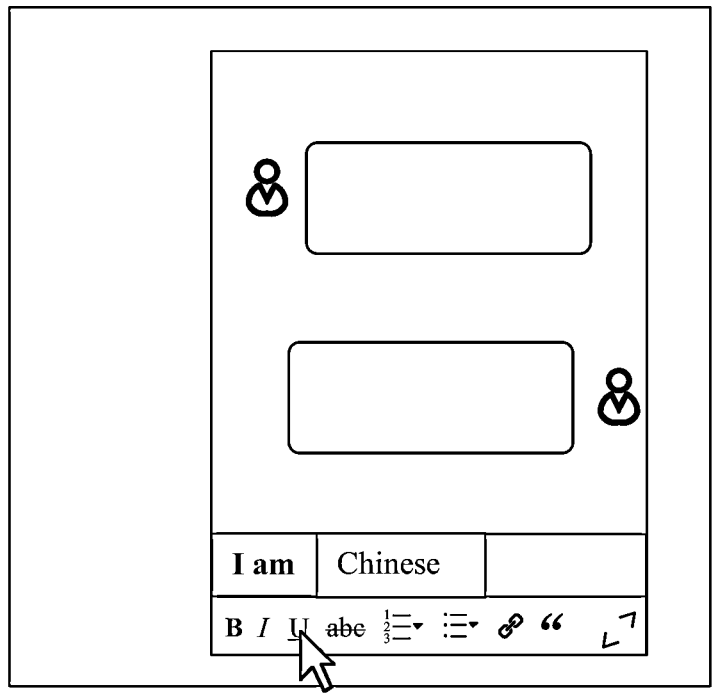
FIG. 5A is a schematic diagram of a further display interface of an IM software provided in some embodiments of the present disclosure.
Figure 5B:
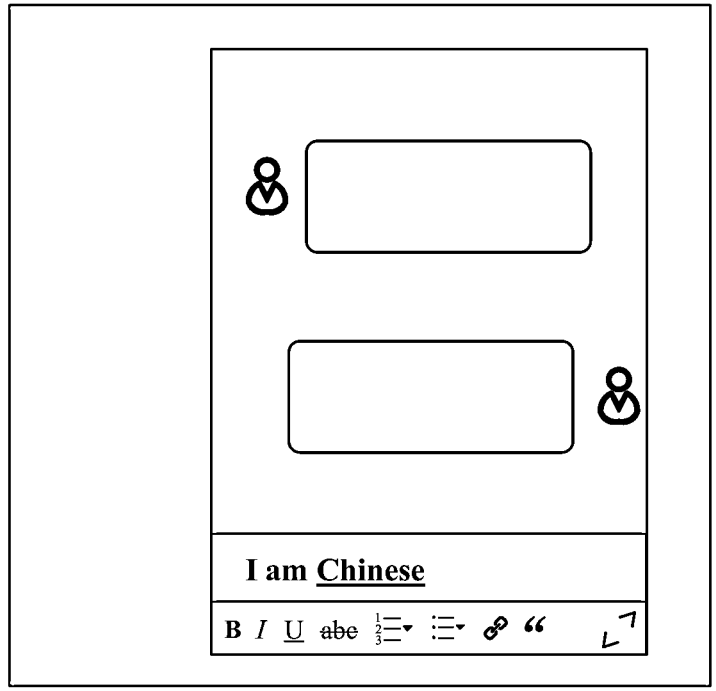
FIG. 5B is a schematic diagram of a further display interface of an IM software provided in some embodiments of the present disclosure.

In some embodiments, the target input content is a portion of the input content in the first input box. For example, the user enters content in the first input box and triggers the underline control after selecting a portion of the input content, as shown in FIG. 5A. After the underline control is triggered, the selected input content is displayed in an underlined style, as shown in FIG. 5B. Obviously, a portion of the input content in the first input box is the target input content.

In the embodiments above, in response to a target editing control being triggered, the target input content in the first or second input box is processed based on a target editing method corresponding to the target editing control, such that the display style of the target input content is changed. Therefore, the target input content is displayed to users in different styles, which improves the diversity of content editing functions to meet the diverse needs of users for content editing functions.

Based on the above embodiments, the second input box may be obtained by changing the size of the first input box.

For example, in a case that the first input box is an input box of the session interface shown in FIG. 1A, in response to a triggering of the switch control, the size of the first input box is increased to obtain the second input box. In a case that the first input box is a rich text input box as shown in FIG. 1B, in response to a triggering of the switch control, the size of the first input box is decreased to obtain the second input box.

Figure 6:
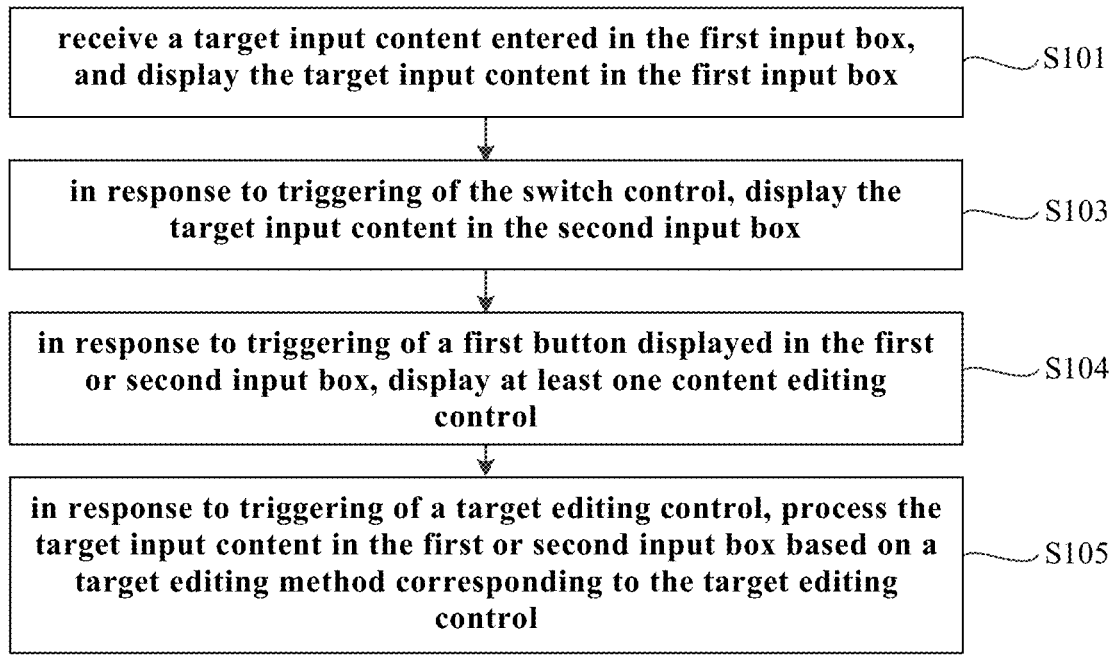
FIG. 6 is a flowchart of still another content input method for an IM software provided in some embodiments of the present disclosure.

FIG. 6 is a flowchart of still another content input method for an IM software provided in some embodiments of the present disclosure. On the basis of the embodiments shown in FIG. 3, FIG. 6 shows an implementation of triggering display of at least one content editing control before step 105, comprising:

S104: in response to triggering of a first button displayed in the first or second input box, displaying at least one content editing control.

The at least one content editing control comprises a target editing control.

Figure 7A:
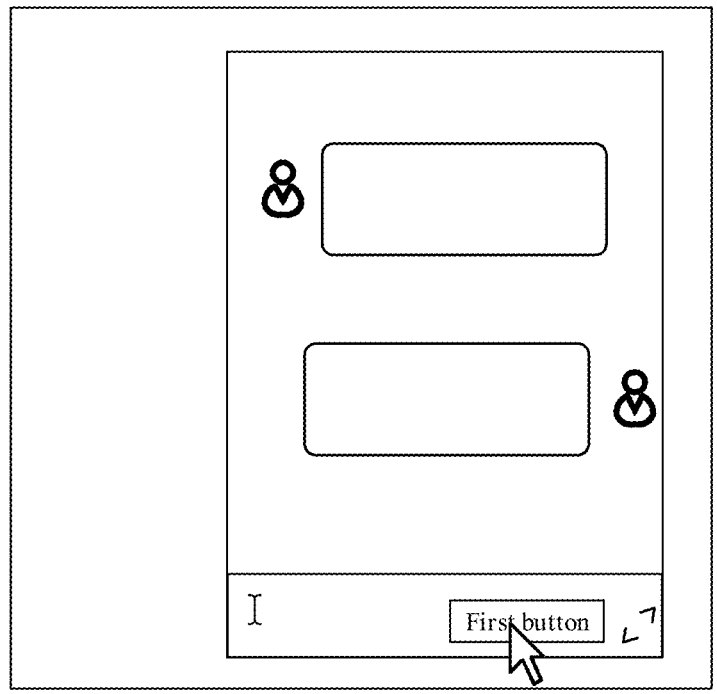
FIG. 7A is a schematic diagram of a further display interface of an IM software provided in some embodiments of the present disclosure.
Figure 7B:
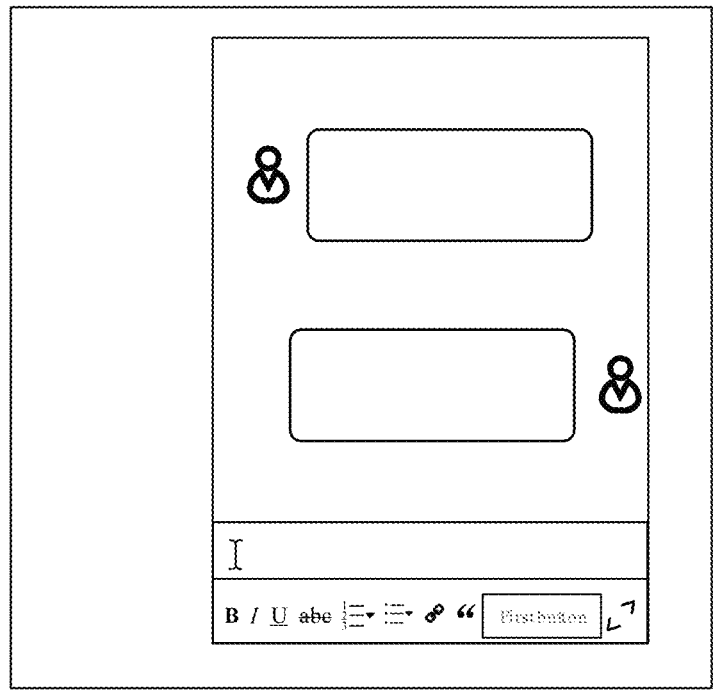
FIG. 7B is a schematic diagram of a further display interface of an IM software provided in some embodiments of the present disclosure.

FIG. 7A is a schematic diagram of a display interface of an IM software provided in some embodiments of the present disclosure. For example, as shown in FIG. 7A, a first button is displayed in the input box of the session interface. A user can trigger the first button by clicking on the first button. For example, the first button may be an "Aa" button. In response to a trigger operation on the first button, at least one content editing control is displayed, as shown in FIG. 7B.

In some embodiments, these content editing controls may comprise at least one of a bold control, an underline control, a strikethrough control, an italic control, a hyperlink control, an arranged list control, an un-arranged list control or a reference control, as well as at least one of other content editing controls, such as a font color control, a font type control, etc. The embodiments have no specific limitation on the content editing controls.

Based on the at least one content editing control displayed, a user selects and triggers one of these content editing controls based on the user's needs, and the content editing control selected by the user is the target editing control.

It should be noted that FIG. 7 only provides an explanation of the input box of the session interface as an example. In other embodiments, the input box may also be a rich text input box.

In the embodiments above, in response to triggering of a first button displayed in the first or second input box, at least one content editing control is displayed. The at least one content editing control comprises a target editing control. In a case that there is no need to edit the input content, the content editing control can be hidden to keep the display interface of the IM software relatively clean, thereby providing an improved user experience. In addition, the first button is displayed in the first input box to facilitate the user's operation.

Figure 8:
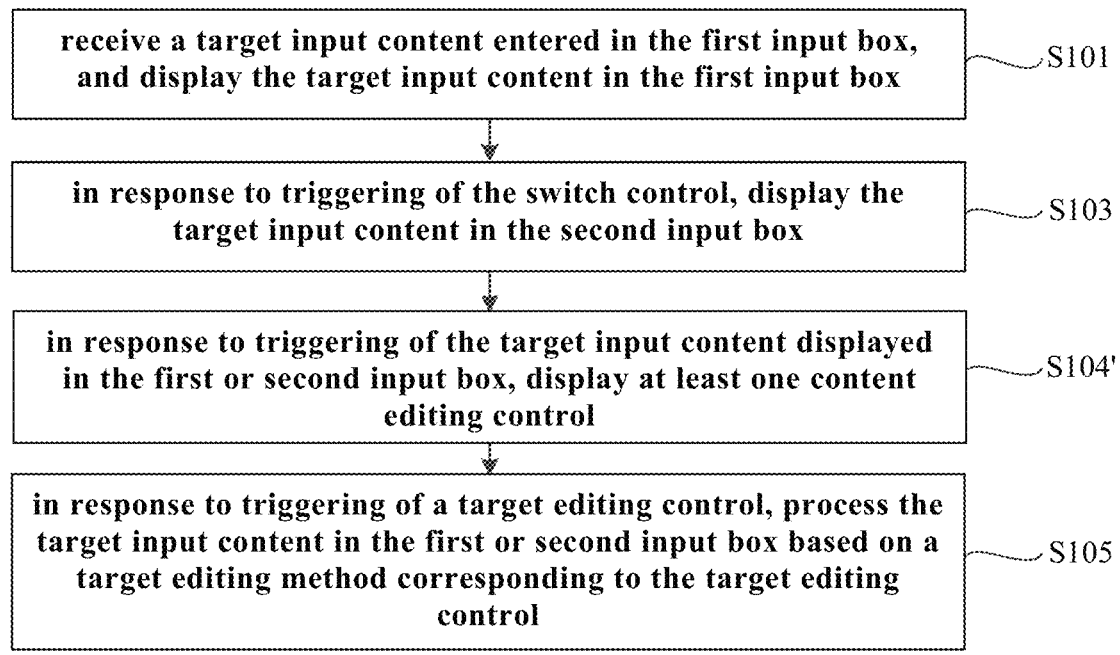
FIG. 8 is a flowchart of a further content input method for an IM software provided in some embodiments of the present disclosure.

FIG. 8 is a flowchart of still another content input method for an IM software provided in some embodiments of the present disclosure. On the basis of the embodiment shown in FIG. 3, FIG. 8 shows an implementation of triggering display of at least one content editing control before step 103, comprising:

S104': in response to triggering of the target input content displayed in the first or second input box, displaying at least one content editing control.

The at least one content editing control comprises a target editing control.

Figure 9A:
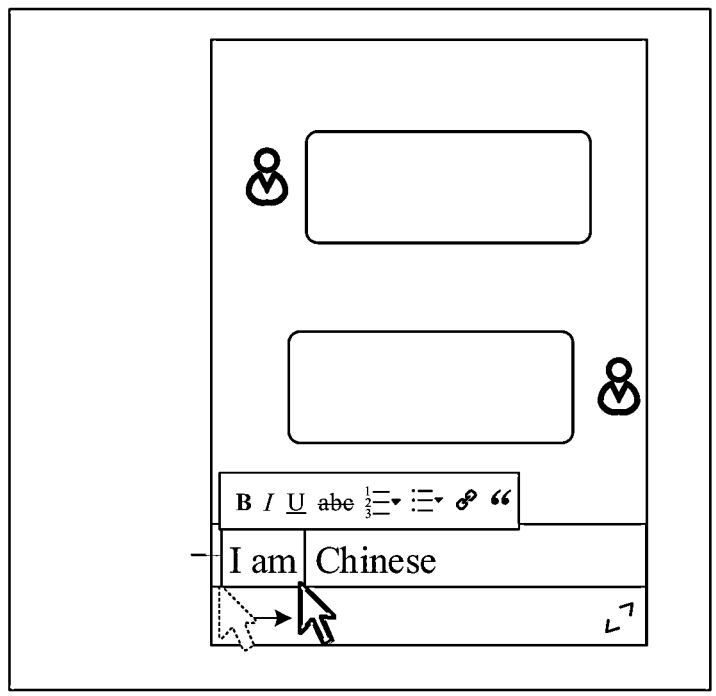
FIG. 9A is a schematic diagram of a further display interface of an IM software provided in some embodiments of the present disclosure.

FIG. 9A is a schematic diagram of a further display interface of an IM software provided in some embodiments of the present disclosure. For example, in the input box of the session interface shown in FIG. 9A, the input content to be edited is selected, that is, the target input content is selected. In response to the selection operation on the target input content, a floating toolbar is displayed near the location of the target input content. At least one content editing control is displayed in the floating toolbar.

In some embodiments, these content editing controls may comprise at least one of a bold control, an underline control, a strikethrough control, an italic control, a hyperlink control, an arranged list control, an un-arranged list control or a reference control, as well as at least one of other content editing controls, such as a font color control, a font type control, etc. The embodiments above have no specific limitation on the content editing controls.

Based on at least one content editing control displayed in the floating toolbar, the user may select and trigger one of these content editing controls based on the user's needs, and the content editing control selected by the user is the target editing control.

In the embodiments above, in response to a triggering of the target input content displayed in the first or second input box, at least one content editing control is displayed. The at least one content editing control comprises a target editing control. In a case that there is no need to edit the input content, the content editing control is hidden to keep the display interface relatively clean, thereby providing an improved user experience. In addition, there is no need to provide a separate button to trigger the display of content editing controls, thereby further improving the conciseness of the display interface.

In some embodiments, based on the above embodiments, the display position of the at least one content editing control is corresponding to the position of the target input content.

Figure 9B:
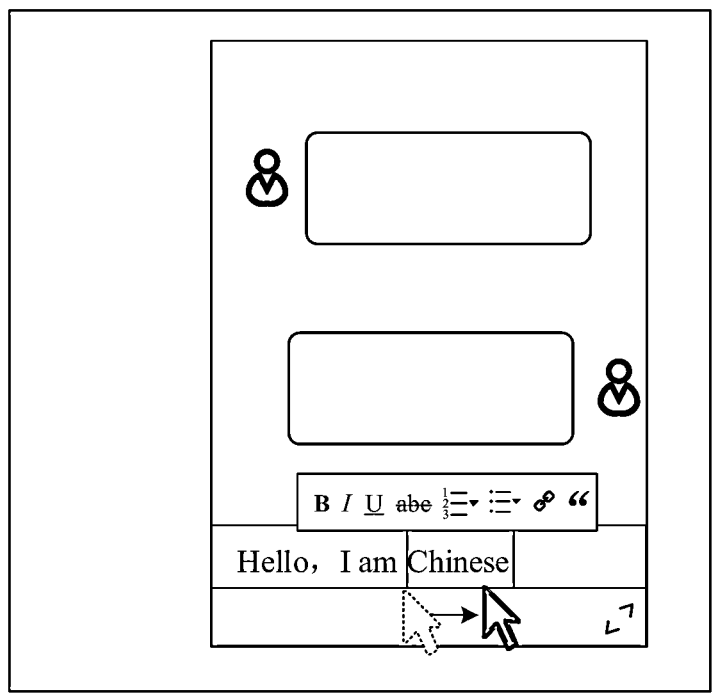
FIG. 9B is a schematic diagram of a further display interface of an IM software provided in some embodiments of the present disclosure.

For example, as shown in FIG. 9A, the floating toolbar is located adjacent to an area where the target input content is located, making it convenient for the user to trigger the content editing controls. For example, the floating toolbar may be located 8 pt above the area where the target input content is located. In some embodiments, in a case that the target input content is located adjacent to an edge of the input box, as shown in FIG. 9A, the corresponding floating toolbar is located within the display box and adjacent to the edge of the display box, ensuring that all content editing controls can be fully displayed. For example, the floating toolbar is located at a position within the display box that is 8 pt from the edge of the display box. In some embodiments, in a case that the target input content is located close to the center of the input box, as shown in FIG. 9B, the corresponding floating toolbar may be arranged symmetrically on both sides of the target input content, thereby maintaining the aesthetics of the display interface.

In the embodiments above, the display position of the at least one content editing control is corresponding to the position of the target input content, so as to facilitate user operation while maintaining the aesthetics of the display interface and the integrity of the content editing controls.

Figure 10:
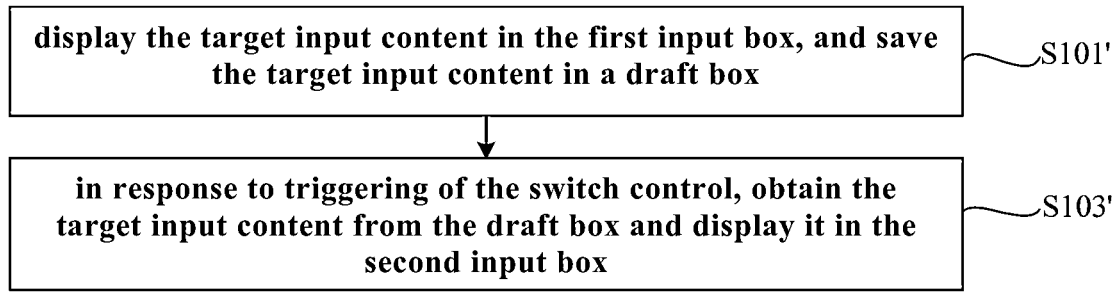
FIG. 10 is a flowchart of a further content input method for an IM software provided in some embodiments of the present disclosure.

FIG. 10 is a flowchart of a further content input method for an IM software provided in some embodiments of the present disclosure. On the basis of the embodiments shown in FIG. 2, FIG. 10 shows an implementation of step S101, comprising:

S101': displaying the target input content in the first input box, and saving the target input content in a draft box.

The user enters the target input content in the first input box. After the target input content is received from the user, the target input content is saved in a draft box and displayed in the first input box.

As shown in FIG. 10, an implementation of step S103 comprises:

S103': in response to a triggering of the switch control, obtaining the target input content from the draft box and displaying the target input content in the second input box.

The first input box and the second input box share the same draft box. In response to a triggering of the switch control, the second input box obtains the target input content previously saved and displayed in the first input box from the draft box and display the target input content in the second input box.

In the embodiments above, the first and second input boxes share a draft box. The target input content is displayed in the first input box and saved to the draft box. In response to a triggering of the switch control, the target input content is obtained from the draft box and displayed in the second input box. There is no data transmission between the first and second input boxes, which can improve the synchronization efficiency of the target input content.

Figure 11:
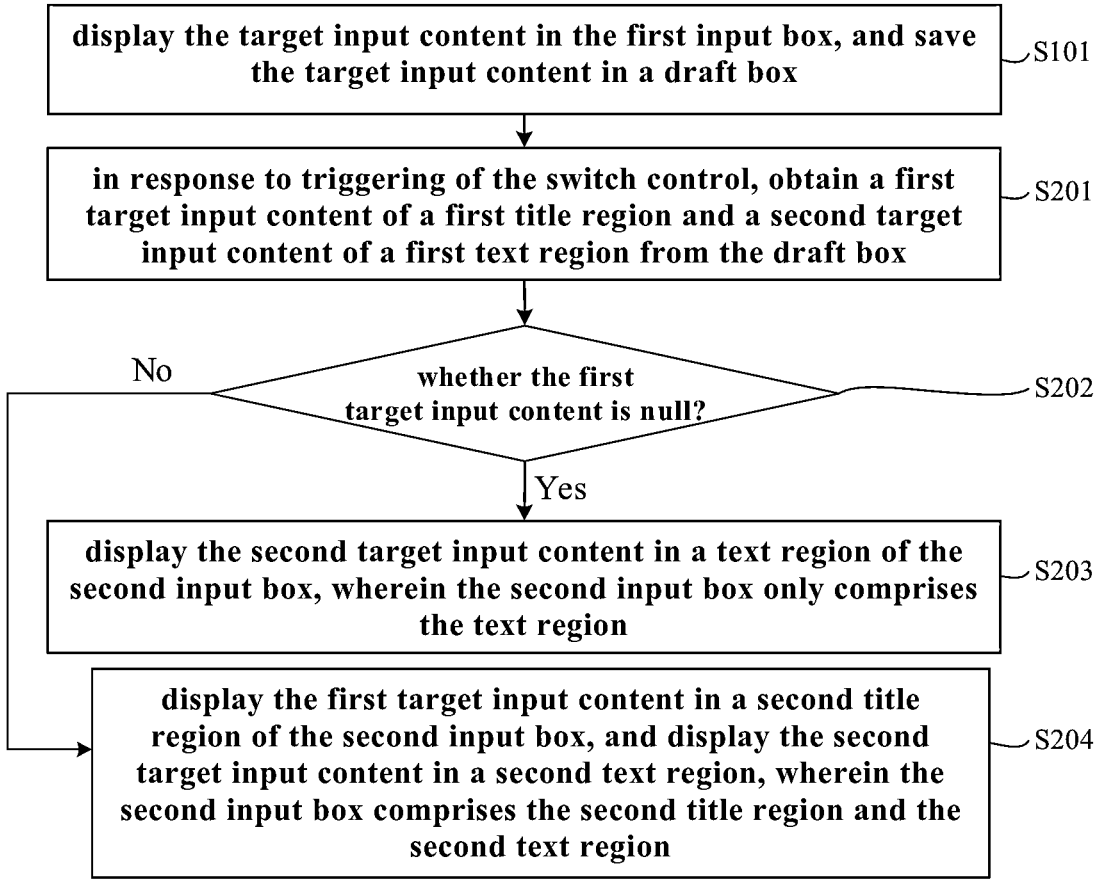
FIG. 11 is a flowchart of a further content input method for an IM software provided in some embodiments of the present disclosure.

FIG. 11 is a flowchart of a further content input method for an IM software provided in some embodiments of the present disclosure. On the basis of the embodiment shown in FIG. 10, FIG. 11 shows an implementation of step S103', comprising:

S201: in response to a triggering of the switch control, obtaining a first target input content of a first title region and a second target input content of a first text region from the draft box.

The size of the first input box is larger than the size of the second input box. For example, the first input box is a rich text input box as shown in FIG. 1B, and the second input box is an input box of the session interface as shown in FIG. 1A.

Figure 12A:
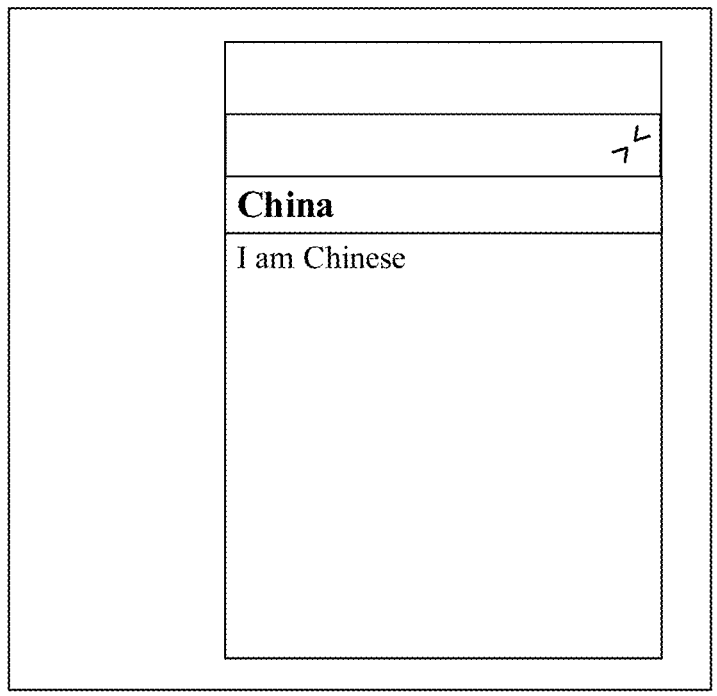
FIG. 12A is a schematic diagram of a further display interface of an IM software provided in some embodiments of the present disclosure.
Figure 12B:
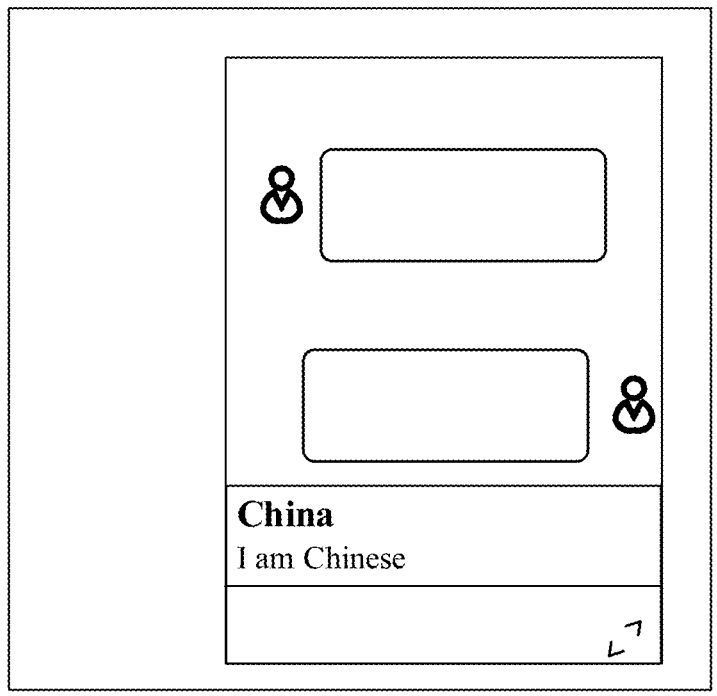
FIG. 12B is a schematic diagram of a further display interface of an IM software provided in some embodiments of the present disclosure.
Figure 12C:
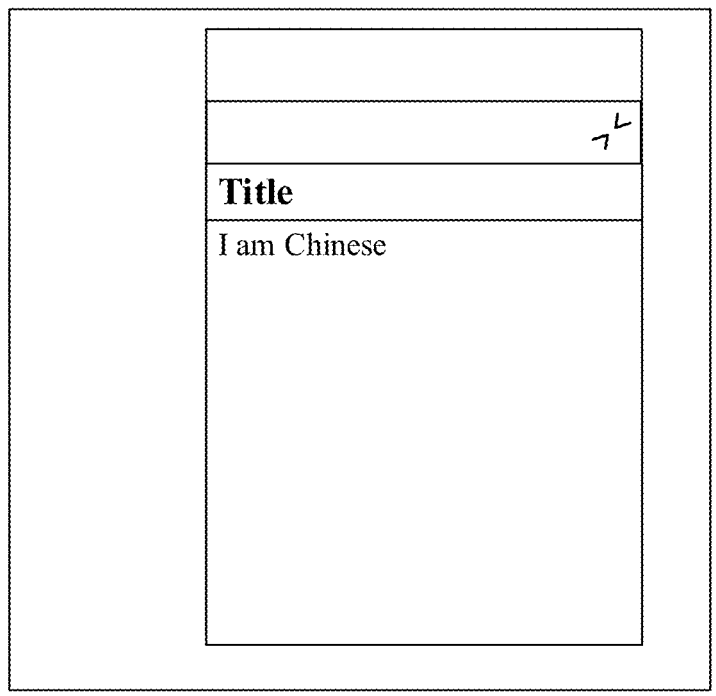
FIG. 12C is a schematic diagram of a further display interface of an IM software provided in some embodiments of the present disclosure.

The first input box comprises: a first title region and a first text region. The first target input content is displayed in the first title region, and the second target input content is displayed in the first text region. The first target input content may not be null. For example, as shown in FIG. 12A, the first target input content displayed in the first title region is "China", and the second target input content displayed in the first text region is "I am Chinese". The first target input content may be null. As shown in FIG. 12C, no content is displayed in the first title region, and the second target input content displayed in the first text region is "I am Chinese".

Based on the above embodiments, the first target input content of the first title region and the second target input content of the first text region are saved in the draft box. A switch control in the first input box is triggered by the user, and in response to a triggering of the switch control, the first target input content of the first title region and the second target input content of the first text region are obtained from the draft box.

S202: determining whether the first target input content is null.

If the first target input content is null, step S203 is performed; otherwise, step S204 is performed.

S203: displaying the second target input content in a text region of the second input box, wherein the second input box only comprises the text region.

Figure 12D:
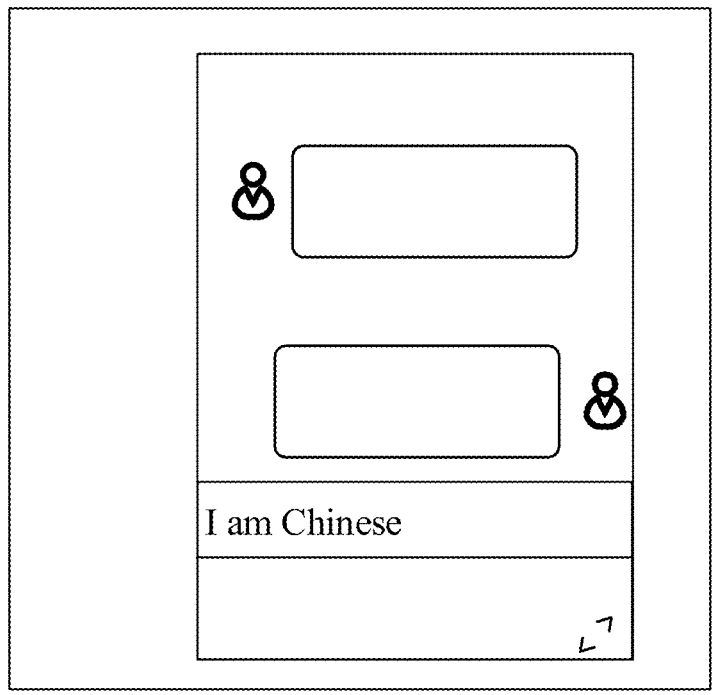
FIG. 12D is a schematic diagram of a further display interface of an IM software provided in some embodiments of the present disclosure.

In a case that the first target input content is null, the second target input content saved in the draft box is obtained and displayed in the text region of the second input box. The displayed second input box only comprises a text region. The title region is omitted for the first target input content, making the displayed second input box more aesthetically pleasing. For example, as shown in FIG. 12C, no content is displayed in the first title region, and the second target input content displayed in the first text region is "I am Chinese". In response to a triggering of the switch control, there is no need to provide a title region above the text region in the second input box. That is, the text region is arranged at the top, and the second target input content "I am Chinese" is displayed in the text region, as shown in FIG. 12D.

S204: displaying the first target input content in a second title region of the second input box, and displaying the second target input content in a second text region, wherein the second input box comprises the second title region and the second text region.

In a case that the first target input content is not null, the first target input content and the second target input content saved in the draft box are obtained. The first target input content is displayed in the second title region of the second input box, and the second target input content is displayed in the second text region, without affecting the display style of the first target input content and the second target input content. For example, as shown in FIG. 12A, the first target input content "China" is displayed in the first title region, and the second target input content "I am Chinese" is displayed in the first text region. In response to a triggering of the switch control, a second title region and a second text region are displayed on the second input box, wherein the first target input content "China" is displayed in the second title region, and the second target input content "I am Chinese" is displayed in the second text region, as shown in FIG. 12B.

Figure 13:
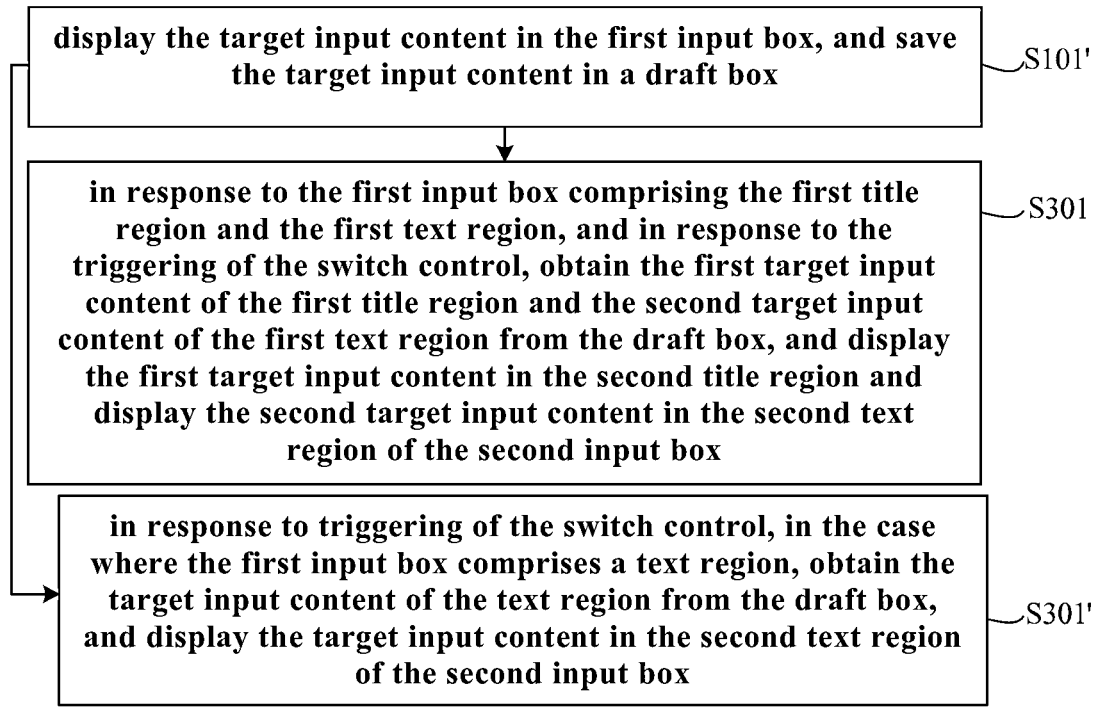
FIG. 13 is a flowchart of a further content input method for an IM software provided in some embodiments of the present disclosure.

FIG. 13 is a flowchart of a further content input method for an IM software provided in some embodiments of the present disclosure. On the basis of the embodiment shown in FIG. 10, FIG. 13 shows an implementation of step S103', comprising:

S301: in response to the first input box comprising the first title region and the first text region, and in response to the triggering of the switch control, obtaining the first target input content of the first title region and the second target input content of the first text region from the draft box, and displaying the first target input content in the second title region and displaying the second target input content in the second text region of the second input box.

The size of the first input box is smaller than the size of the second input box. For example, the first input box is an input box of the session interface as shown in FIG. 1A, and the second input box is a rich text input box as shown in FIG. 1B.

For example, the first input box comprises: a first title region and a first text region. The first target input content is displayed in the first title region, and the second target input content is displayed in the first text region, as shown in FIG. 12B. In this situation, the first target input content and the second target input content are saved in a draft box. In response to the switch control being triggered by a user, the first and second target input contents are obtained from the draft box. The first target input content is displayed in the second title region of the second input box, and the second target input content is displayed in the second text region of the second input box.

For example, a first title region and a first text region are displayed on the first input box, wherein the first target input content "China" is displayed in the first title region, and the second target input content "I am Chinese" is displayed in the first text region, as shown in FIG. 12B. In response to a triggering of the switch control, a second title region and a second text region are displayed on the second input box, wherein the first target input content "China" is displayed in the second title region and the second target input content "I am Chinese" is displayed in the second text region, as shown in FIG. 12A.

S301': in response to a triggering of the switch control, and in response to the first input box only comprising a text region, obtaining the target input content of a text region from the draft box, and displaying the target input content in the second text region of the second input box.

The size of the first input box is smaller than the size of the second input box. For example, the first input box is an input box of the session interface as shown in FIG. 1A, and the second input box is a rich text input box as shown in FIG. 1B.

For example, the first input box only comprises a text region, as shown in FIG. 12D. The target input content is displayed in the text region. In this case, only the target input content is saved in the draft box. In response to the switch control being triggered by a user, the target input content is obtained from the draft box, and is displayed in the second text region of the second input box.

For example, only a text region is displayed in the first input box, in which the target input content "I am Chinese" is displayed, as shown in FIG. 12D. In response to a triggering of the switch control, a second title region and a second text region are displayed in the second input box, wherein the target input content "China" is displayed in the second text region, and no content is displayed in the second title region, as shown in FIG. 12C.

Figure 14:
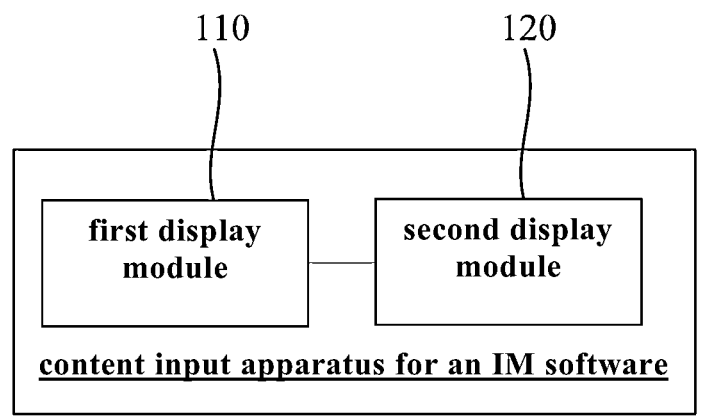
FIG. 14 is a structure diagram of a content input apparatus for an IM software provided in some embodiments of the present disclosure.

The present disclosure further provides a content input apparatus for an IM software. FIG. 14 is a structure diagram of a content input apparatus for an IM software provided in some embodiments of the present disclosure. As shown in FIG. 14, the content input apparatus for IM software comprises:
- a first display module 110 for receiving a target input content entered in the first input box, and displaying the target input content in the first input box;
- a second display module 120 for displaying, in response to triggering of the switch control, the target input content in the second input box.

In some embodiments, the content input apparatus further comprises:
- a processing module for processing, in response to triggering of a target editing control, the target input content in the first or second input box based on a target editing method corresponding to the target editing control.

In some embodiments, the apparatus further comprises:
- a changing module for changing the size of the first input box to obtain the second input box in response to triggering of the switch control.

In some embodiments, the first display module 110 is further used for displaying, in response to triggering of a first button displayed in the first input box, at least one content editing control, wherein the at least one content editing control comprises the target editing control.

The second display module 120 is further used for displaying, in response to triggering of a first button displayed in the second input box, at least one content editing control, wherein the at least one content editing control comprises the target editing control.

In some embodiments, the first display module 110 is further used for displaying, in response to triggering of the target input content displayed in the first input box, at least one content editing control, wherein the at least one content editing control comprises the target editing control.

The second display module 120 is further used for displaying, in response to triggering of the target input content displayed in the second input box, at least one content editing control, wherein the at least one content editing control comprises the target editing control.

In some embodiments, the first input box and the second input box share a draft box.

The first display module 110 is further used for displaying the target input content in the first input box, and saving the target input content in the draft box.

The second display module 120 is further used for obtaining, in response to triggering of the switch control, the target input content from the draft box and displaying the target input content in the second input box.

In some embodiments, the display position of the at least one content editing control is corresponding to the position of the target input content.

In some embodiments, the size of the first input box is larger than the size of the second input box, wherein the first input box comprises: a first title region and a first text region.

The second display module 120 is further used for obtaining a first target input content of the first title region and a second target input content of the first text region from the draft box in response to triggering of the switch control; displaying the second target input content in a text region of the second input box, in response to that the first target input content is null, wherein the second input box only comprises the text region; displaying the first target input content in a second title region of the second input box, and displaying the second target input content in a second text region, in response to the first target input content is not null, wherein the second input box comprises the second title region and the second text region.

In some embodiments, the size of the first input box is smaller than the size of the second input box, wherein the first input box comprises: a text region; or the first input box comprises: a first title region and a first text region; the second input box comprises: a second title region and a second text region.

The second display module 120 is further used for, in response to the first input box comprising the first title region and the first text region, and in response to the triggering of the switch control, obtaining the first target input content of the first title region and the second target input content of the first text region from the draft box, and then displaying the first target input content in the second title region and displaying the second target input content in the second text region of the second input box; in response to the first input box comprising the text region, and in response to the triggering of the switch control, obtaining the target input content of a text region from the draft box, and displaying the target input content in the second text region of the second input box.

In some embodiments, the at least one content editing control comprises at least one of:
  a bold control, an underline control, a strikethrough control, an italic control, a hyperlink control, an arranged list control, an un-arranged list control and a reference control.

The apparatus provided in this embodiment can perform the technical solution of any method embodiment described above. The implementation principle of the apparatus and the technical effect achieved are similar to those of the method embodiment, which will not be repeated here.

An embodiment of the present disclosure further provides an electronic device, comprising: a processor for executing a computer program stored in memory, wherein the processor, when executing the computer program, implements the steps of the method embodiment described above.

An embodiment of the present disclosure further provides a computer-readable storage medium stored thereon a computer program that, when executed by a processor, implements the steps of the above method embodiment.

An embodiment of the present disclosure further provides a computer program product that, when running on a computer, causes the computer to implement the steps of the above method embodiment of the present disclosure.

In a first aspect, the present disclosure provides a content input method for IM software that comprises a first input box and a second input box having a size different from a size of the first input box, and a switch control for switching between the first and second input boxes, the method comprising:
  receiving a target input content entered in the first input box, and displaying the target input content in the first input box;
  in response to triggering of the switch control, displaying the target input content in the second input box.

In some embodiments, the method further comprises:
  in response to triggering of a target editing control, processing the target input content in the first or second input box based on a target editing method corresponding to the target editing control.

In some embodiments, the method further comprises:
  changing the size of the first input box to obtain the second input box in response to triggering of the switch control.

In some embodiments, the method further comprises:
  in response to triggering of a first button displayed in the second input box, displaying at least one content editing control, wherein the at least one content editing control comprises the target editing control;
  or
  in response to triggering of the target input content displayed in the first or second input box, displaying at least one content editing control, wherein the at least one content editing control comprises the target editing control.

In some embodiments, the first input box and the second input box share a draft box;
  receiving a target input content entered in the first input box, and displaying the target input content in the first input box comprises:
  displaying the target input content in the first input box, and saving the target input content in the draft box;
  wherein in response to triggering of the switch control, displaying the target input content in the second input box comprises:
  in response to triggering of the switch control, obtaining the target input content from the draft box and displaying the target input content in the second input box.

In some embodiments, the display position of the at least one content editing control is corresponding to the position of the target input content.

In some embodiments, the size of the first input box is larger than the size of the second input box, wherein the first input box comprises: a first title region and a first text region;
  wherein in response to triggering of the switch control, obtaining the target input content from the draft box and displaying the target input content in the second input box comprises:
  in response to triggering of the switch control, obtaining a first target input content of a first title region and a second target input content of a first text region from the draft box;
  displaying the second target input content in a text region of the second input box, in response to that the first target input content is null, wherein the second input box only comprises the text region;
  displaying the first target input content in a second title region of the second input box, and displaying the second target input content in a second text region, in response to the first target input content is not null, wherein the second input box comprises the second title region and the second text region.

In some embodiments, the size of the first input box is smaller than the size of the second input box, wherein the first input box comprises: a text region; or the first input box comprises: a first title region and a first text region; the second input box comprises: a second title region and a second text region;
  wherein in response to triggering of the switch control, obtaining the target input content from the draft box and displaying the target input content in the second input box comprises:
  in response to the first input box comprising the first title region and the first text region, and in response to the triggering of the switch control, obtaining the first target input content of the first title region and the second target input content of the first text region from the draft box, and displaying the first target input content in the second title region and displaying the second target input content in the second text region of the second input box;
  in response to the first input box comprising the text region, and in response to the triggering of the switch control, obtaining the target input content of a text region from the draft box, and displaying the target input content in the second text region of the second input box.

In some embodiments, the at least one content editing control comprises at least one of:
  a bold control, an underline control, a strikethrough control, an italic control, a hyperlink control, an arranged list control, an un-arranged list control and a reference control.

In a second aspect, the present disclosure provides a content input apparatus for IM software that comprises a first input box and a second input box having a size different from a size of the first input box, and a switch control for switching between the first and second input boxes, the apparatus comprising:

a first display module for receiving a target input content entered in the first input box, and displaying the target input content in the first input box;

a second display module for displaying, in response to triggering of the switch control, the target input content in the second input box.

In some embodiments, the method further comprises:

a processing module for processing, in response to triggering of a target editing control, the target input content in the first or second input box based on a target editing method corresponding to the target editing control.

In some embodiments, the apparatus further comprises:

a changing module for changing the size of the first input box to obtain the second input box in response to triggering of the switch control.

In some embodiments, the first display module is further used for displaying, in response to triggering of a first button displayed in the first input box, at least one content editing control, wherein the at least one content editing control comprises the target editing control.

The second display module is further used for displaying, in response to triggering of a first button displayed in the second input box, at least one content editing control, wherein the at least one content editing control comprises the target editing control.

In some embodiments, the first display module is further used for displaying, in response to triggering of the target input content displayed in the first input box, at least one content editing control, wherein the at least one content editing control comprises the target editing control.

The second display module is further used for displaying, in response to triggering of the target input content displayed in the second input box, at least one content editing control, wherein the at least one content editing control comprises the target editing control.

In some embodiments, the first input box and the second input box share a draft box.

The first display module is further used for displaying the target input content in the first input box, and saving the target input content in the draft box.

The second display module is further used for obtaining, in response to triggering of the switch control, the target input content from the draft box and displaying the target input content in the second input box.

In some embodiments, the display position of the at least one content editing control is corresponding to the position of the target input content.

In some embodiments, the size of the first input box is larger than the size of the second input box, wherein the first input box comprises: a first title region and a first text region;

the second display module is further used for obtaining a first target input content of the first title region and a second target input content of the first text region from the draft box in response to triggering of the switch control; displaying the second target input content in a text region of the second input box, in response to that the first target input content is null, wherein the second input box only comprises the text region; displaying the first target input content in a second title region of the second input box, and displaying the second target input content in a second text region, in response to the first target input content is not null, wherein the second input box comprises the second title region and the second text region.

In some embodiments, the size of the first input box is smaller than the size of the second input box, wherein the first input box comprises: a text region; or the first input box comprises: a first title region and a first text region; the second input box comprises: a second title region and a second text region.

The second display module is further used for, in response to the first input box comprising the first title region and the first text region, and in response to the triggering of the switch control, obtaining the first target input content of the first title region and the second target input content of the first text region from the draft box, and then displaying the first target input content in the second title region and displaying the second target input content in the second text region of the second input box; in response to the first input box comprising the text region, and in response to the triggering of the switch control, obtaining the target input content of a text region from the draft box, and displaying the target input content in the second text region of the second input box.

In some embodiments, the at least one content editing control comprises at least one of:

a bold control, an underline control, a strikethrough control, an italic control, a hyperlink control, an arranged list control, an un-arranged list control and a reference control.

In a third aspect, the present disclosure provides an electronic device, comprising: a processor for executing a computer program stored in memory, wherein the processor, when executing the computer program, implements the method provided in the first aspect.

In a fourth aspect, the present disclosure provides a computer readable storage medium storing thereon a computer program, characterized in that the computer program, when executed by a processor, implements the method provided in the first aspect.

In a fifth aspect, the present disclosure provides a computer program product that, when running on a computer, causes the computer to implement the method provided in the first aspect.

In a sixth aspect, the present disclosure provides a computer program, comprising: instructions that, when executed by a processor, cause the processor to perform the content input method according to any embodiments of the present disclosure.

Note that, in this description, the use of relational terms, if any, such as "first" and "second" and the like are used solely to distinguish one from another entity or action without necessarily requiring or implying any actual such relationship or order between such entities or actions. Further, terms "comprise", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A content input method for an instant messaging software, comprising:
receiving a target input content entered in a first input box, and displaying the target input content in the first input box, wherein the instant messaging software comprises the first input box and a second input box, the first input box and the second input box are switched through a switching control, and the first input box and the second input box are of different sizes; and
displaying the target input content in the second input box, in response to a triggering of the switch control,
wherein the first input box and the second input box share a draft box,
the receiving the target input content entered in the first input box, and displaying the target input content in the first input box comprises:
displaying the target input content in the first input box, and saving the target input content in the draft box; and
the displaying the target input content in the second input box, in response to the triggering of the switch control comprises:
obtaining the target input content from the draft box and displaying the target input content in the second input box, in response to the triggering of the switch control,
wherein a size of the first input box is larger than a size of the second input box, the first input box comprises a first title region and a first text region, and
the obtaining the target input content from the draft box and displaying the target input content in the second input box, in response to the triggering of the switch control comprises:
obtaining a first target input content of the first title region and a second target input content of the first text region from the draft box, in response to the triggering of the switch control.

2. The content input method according to claim 1, further comprising:
processing the target input content in the first input box or the second input box based on a target editing method corresponding to a target editing control, in response to a triggering of the target editing control.

3. The content input method according to claim 2, further comprising:
displaying at least one content editing control, in response to a triggering of a first button displayed the first input box or the second input box, wherein the at least one content editing control comprises the target editing control.

4. The content input method according to claim 3, wherein a display position of the at least one content editing control is corresponding to a position of the target input content.

5. The content input method according to claim 3, wherein the at least one content editing control comprises at least one of:
a bold control, an underline control, a strikethrough control, an italic control, a hyperlink control, an arranged list control, an un-arranged list control, or a reference control.

6. The content input method according to claim 2, further comprising:
displaying at least one content editing control, in response to a triggering of the target input content displayed in the first or the second input box, wherein the at least one content editing control comprises the target editing control.

7. The content input method according to claim 1, further comprising:
changing a size of the first input box to obtain the second input box, in response to the triggering of the switch control.

8. The content input method according to claim 1, wherein the obtaining the target input content from the draft box and displaying the target input content in the second input box, in response to the triggering of the switch control comprises:
displaying the second target input content in a text region of the second input box, in response to that the first target input content is null, wherein the second input box only comprises the text region; and
displaying the first target input content in a second title region of the second input box, and displaying the second target input content in a second text region, in response to the first target input content is not null, wherein the second input box comprises the second title region and the second text region.

9. The content input method according to claim 1, wherein a size of the first input box is smaller than a size of the second input box,
the first input box comprises a text region or the first input box comprises a first title region and a first text region,
the second input box comprises a second title region and a second text region, and
the obtaining the target input content from the draft box and displaying the target input content in the second input box, in response to the triggering of the switch control comprises:
obtaining a first target input content of a first title region and a second target input content of a first text region from the draft box, and displaying the first target input content in the second title region and displaying the second target input content in the second text region, in response to the first input box comprising the first title region and the first text region, and in response to the triggering of the switch control; and
obtaining the target input content of a text region from the draft box, and displaying the target input content in the second text region of the second input box, in response to the first input box comprising the text region, and in response to the triggering of the switch control.

10. An electronic device, comprising: a processor for executing a computer program stored in memory, wherein the processor, when executing the computer program, implements a content input method for an instant messaging software comprising:
receiving a target input content entered in a first input box, and displaying the target input content in the first input box, wherein the instant messaging software comprises the first input box and a second input box, the first input box and the second input box are switched through a switching control, and the first input box and the second input box are of different sizes; and
displaying the target input content in the second input box, in response to a triggering of the switch control,
wherein the first input box and the second input box share a draft box,
wherein the content input method implemented by the processor further comprises:
displaying the target input content in the first input box, and saving the target input content in the draft box; and obtaining the target input content from the draft box and displaying the target input content in the second input box, in response to the triggering of the switch control, wherein a size of the first input box is larger than a size of the second input box, the first input box comprises a first title region and a first text region, and the obtaining the target input content from the draft box and displaying the target input content in the second input box, in response to the triggering of the switch control comprises:

obtaining a first target input content of the first title region and a second target input content of the first text region from the draft box, in response to the triggering of the switch control.

11. The electronic device according to claim 10, wherein the processor is configured to:

process the target input content in the first input box or the second input box based on a target editing method corresponding to a target editing control, in response to a triggering of the target editing control.

12. The electronic device according to claim 11, wherein the processor is configured to:

display at least one content editing control, in response to a triggering of a first button displayed the first input box or the second input box, wherein the at least one content editing control comprises the target editing control.

13. The electronic device according to claim 12, wherein a display position of the at least one content editing control is corresponding to a position of the target input content.

14. The electronic device according to claim 11, wherein the processor is configured to:

display at least one content editing control, in response to a triggering of the target input content displayed in the first or the second input box, wherein the at least one content editing control comprises the target editing control.

15. The electronic device according to claim 10, wherein the processor is configured to:

change a size of the first input box to obtain the second input box, in response to the triggering of the switch control.

16. The electronic device according to claim 10, wherein a size of the first input box is larger than a size of the second input box, the first input box comprises a first title region and a first text region, and the processor is configured to:

obtain a first target input content of the first title region and a second target input content of the first text region from the draft box, in response to the triggering of the switch control.

17. A non-transitory computer-readable storage medium having stored thereon a computer program that, when executed by a processor, implements a content input method for an instant messaging software comprising:

receiving a target input content entered in a first input box, and displaying the target input content in the first input box, wherein the instant messaging software comprises the first input box and a second input box, the first input box and the second input box are switched through a switching control, and the first input box and the second input box are of different sizes; and displaying the target input content in the second input box, in response to a triggering of the switch control, wherein the first input box and the second input box share a draft box, the receiving the target input content entered in the first input box, and displaying the target input content in the first input box comprises:

displaying the target input content in the first input box, and saving the target input content in the draft box; and the displaying the target input content in the second input box, in response to the triggering of the switch control comprises:

obtaining the target input content from the draft box and displaying the target input content in the second input box, in response to the triggering of the switch control, wherein a size of the first input box is larger than a size of the second input box, the first input box comprises a first title region and a first text region, and the obtaining the target input content from the draft box and displaying the target input content in the second input box, in response to the triggering of the switch control comprises:

obtaining a first target input content of the first title region and a second target input content of the first text region from the draft box, in response to the triggering of the switch control.

* * * * *